W. H. RICHARDS.
WATER METER.
APPLICATION FILED MAY 17, 1918.
1,285,388.
Patented Nov. 19, 1918.
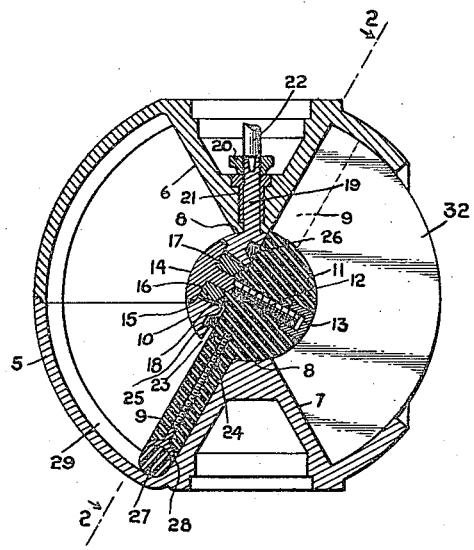
INVENTOR
Walter H. Richards

UNITED STATES PATENT OFFICE.

WALTER H. RICHARDS, OF NEW LONDON, CONNECTICUT.

WATER-METER.

1,285,388. Specification of Letters Patent. Patented Nov. 19, 1918.

Application filed May 17, 1918. Serial No. 235,154.

*To all whom it may concern:*

Be it known that I, WALTER H. RICHARDS, a citizen of the United States of America, residing at New London, Conn., have invented a new and useful Water-Meter, of which the following is a specification.

The present invention relates to liquid meters of the "wide-angle" type such as disclosed in my Patents #1,186,610 and #1,200,521 and the principal objects of the invention are to provide simple and practical means for maintaining the nutatory disk element properly positioned centrally within the meter casing.

Other objects are to facilitate the movements of the disk throughout the comparatively wide angle employed, to reduce friction as much as possible, to prevent leakage, to provide for the centralizing of the disk and to enable the disk to adapt itself to small obstructions such as might be carried in with the liquid.

Briefly stated, the invention comprises a meter casing having opposed bearings, substantially spherical bearing segments engaged with said bearings and carrying the nutatory disk, said bearing segments and disk being held together by a stud and a bearing roller being loosely engaged on said stud and forming a bearing between the segment and the disk. A packing member is usually provided between the bearing segment and the disk and said segment is usually provided with a spindle journaled in the upper main bearing and having a thrust collar which may be adjusted for the purpose of centralizing the nutatory element.

In the accompanying drawing I have illustrated my invention embodied in a concrete, practical form but it will be understood that changes and modifications may be made without departure from the true spirit and scope of the invention.

In this drawing:—

Figure 1, is a vertical sectional view taken through the operative portions of the meter.

Fig. 2, is a sectional view taken substantially on the plane of the line 2—2 of Fig. 1.

Fig. 3, is a broken sectional view of a slightly modified form of the invention.

Fig. 4, is a detached plan view of the loose bearing segment in this form.

The meter casing is designated 5 and is formed with the oppositely disposed upper and lower cones 6 and 7 terminating in the opposed partly spherical bearings or seats 8.

9 designates the nutatory disk, 10 the upper or loose spherically shaped bearing segment and 11 the lower bearing segment, which is shown as fixed to and forming a part of the disk.

The two bearing segments and disk are held together by a stud 12 threaded into the material of the disk and lower bearing segment, secured in adjusted position by a lock nut 13 at its lower end and having a head 14 at its upper end seating in a recess 15 in the upper bearing segment. The exposed head and lock nut of the through stud are shown spherically shaped to conform to the curvature of the bearing segments.

Rotatably engaged upon the shank of the stud and seating within a recess 16 beneath the head of the securing stud is a substantially conical bearing roller 17, said roller providing in effect, a floating bearing between the loose segment or stud and the face of the disk. This bearing roller is shown as centered upon the disk by means of a substantially hemispherical projection 18 on the face of the disk which fits into a corresponding seat in the end of the roller.

19 designates the spindle of the upper bearing segment which is journaled in the upper main bearing. This spindle carries, in the illustration, a thrust collar 20 bearing upon the bushing 21 surrounding the spindle, said thrust collar being adjustable as by being screw threaded on the spindle for the purpose of lifting or lowering the segment and attached parts for centralizing and supporting the disk and bearing segments. The registering mechanism may be connected with this spindle as by means of the shaft indicated at 22.

In order that the nutatory element described may adjust itself more or less to small obstructions which may be carried into the meter casing by the liquid, lodging between the cone and disk I have shown the seats 15 and 16 in the loose segment as formed somewhat eccentrically (see Fig. 2) and have cut away the lower edge portion of the loose segment as indicated at 23. This construction enables the disk and lower bearing segment to lift somewhat and thus ride over any small obstructions which may be encountered in the meter chamber, between the disk and cone.

To prevent leakage between the pivoted ball segment and the disk I have provided a packing washer 24 seated loosely in a groove 25 in the lower face of the segment, the same having a conical bearing with the segment at 26 so that the pressure of the liquid will tend to make this joint water-tight.

The disk is controlled in its nutatory movement, in my present invention, by a bearing ball 27 seated in a substantially hemispherical socket 28 provided in the rim of the disk and bearing in a circumferentially extending channel 29 which is substantially semicircular in cross section. This construction provides a light and practically frictionless bearing for guiding the disk, and preventing contact with the partition 32, the disk being slotted at 33 to pass over said partition.

The construction illustrated in Figs. 3 and 4 is designed particularly for smaller meters. In this case the conical bearing between the stud and loose ball segment is provided by means of a substantially conical head 17' on the stud 12' fitting loosely in a substantially conically shaped and eccentrically disposed socket 15' in the segment and in this case, the substantially hemispherical projection 18' on the face of the disk has a bearing in a seat formed directly in the face of the segment.

In this modified construction also, the bearing spindle 19' is shown as having an angularly directed portion 30 threaded into the material of the loose ball segment. As this method of securing the bearing spindle hardly leaves room for the packing washer at the point where said spindle is engaged with the segment, the packing washer 24' may, in this case, be discontinued or broken beneath the point where the spindle is secured as indicated at 31 in Fig. 4.

The features disclosed all contribute to centralizing and maintaining the nutatory element properly centralized within the meter chamber and enable the disk being operated throughout a range considerably greater than 90°. This provides a meter of large capacity in a relatively small compact form. Any wear of the parts may be readily compensated for either by adjustment of the stud, or by properly setting the thrust collar, and of course if necessary, both such adjustments may be employed for the purpose of centralizing or taking up wear.

I claim:

1. In a liquid meter, the combination of a meter casing having opposed bearings, bearing segments engaged with said bearings, a nutatory disk carried by said bearing segments, a pivot stud securing the bearing segments together and a bearing roller loosely surrounding said pivot stud, said bearing segment having a socket-receiving said bearing roller and eccentric to the axis of the pivot stud.

2. In a liquid meter, the combination of a meter casing having opposed bearings, bearing segments engaged with said bearings, a nutatory disk carried by said bearing segments, a pivot stud securing the bearing segments together, a bearing roller loosely surrounding said pivot stud, said bearing segment having a socket receiving said bearing roller and eccentric to the axis of the pivot stud, and said bearing segment being spaced away from the nutatory disk for a portion of its extent to enable a certain rocking movement of the disk with respect to said bearing segment.

3. In a liquid meter, a meter casing having opposed bearings, bearing segments engaged with said bearings, a nutatory disk carried by said bearing segments, one of said bearing segments having a sliding engagement with the face of said nutatory disk and a loose packing member loosely interposed between said segment and the face of the nutatory disk.

4. In a liquid meter, a meter casing having opposed bearings, bearing segments engaged with said bearings, a nutatory disk carried by said bearing segments, one of said bearing segments having a sliding engagement with the face of said nutatory disk, a pivot stud extending through the segments and disk and securing the same together, a spindle carried by the loose segment aforesaid and projecting through the bearing provided therefor, and means for adjusting said spindle whereby to position the nutatory element described.

5. In a liquid meter, a meter casing having opposed bearings, bearing segments engaged with said bearings, a nutatory disk carried by said bearing segments, one of said bearing segments having a sliding engagement with the face of said nutatory disk, a pivot stud extending through the segments and disk and securing the same together, a spindle carried by the loose segment aforesaid and projecting through the bearing provided therefor, and a thrust collar on said spindle for supporting and positioning the bearing segments and nutatory disk.

6. In a liquid meter, a meter casing having opposed bearings, bearing segments engaged with said bearings, a nutatory disk carried by said bearing segments, one of said bearing segments having a sliding engagement with the face of said nutatory disk and a bearing roller loosely engaged between said bearing segment and the nutatory disk.

7. In a liquid meter, a meter casing having opposed bearings, bearing segments engaged with said bearings, a nutatory disk carried by said bearing segments, one of said bearing segments having a sliding engagement with the face of said nutatory disk, a bearing roller loosely engaged between said bearing segment and the nutatory disk and means for centering said bearing roller with respect to the disk and bearing segment.

8. In a liquid meter, a meter casing having opposed bearings, bearing segments engaged with said bearings, a nutatory disk carried by said bearing segments, one of said bearing segments having a sliding engagement with the face of said nutatory disk and substantially hemispherical coöperating bearing portions on the disk and said last mentioned segment for centering said segment with respect to the disk.

9. In a liquid meter, a meter casing having opposed bearings, bearing segments engaged with said bearings, a nutatory disk carried by said bearing segments, one of said bearing segments having a sliding engagement with the face of said nutatory disk and provided with a spindle journaled in the bearing for said segment, a headed stud securing said pivoted segment to the other segment and the nutatory disk and a bearing roller loosely engaged about said pivot stud beneath the head thereof.

10. In a liquid meter, a meter casing having opposed bearings, ball segments engaged with said bearings, a nutatory disk carried by said ball segments and a substantially hemispherical bearing interposed between the disk and one of the bearing segments.

11. In a liquid meter, a meter casing having opposed bearings, ball segments engaged with said bearings, a nutatory disk carried by said segments, one of said segments being loosely confined to the disk and said disk having a substantially hemispherical central projection on the face thereof forming a bearing between the disk and the loose segment.

12. In a liquid meter, a meter casing having opposed bearings, ball segments engaged with said bearings, a nutatory disk carried by said segments, a pivot stud loosely confining one of the ball segments to the disk and a substantially conical bearing between said stud and said loose segment.

13. In a liquid meter, a meter casing having opposed bearings, ball segments engaged with said bearings, a nutatory disk carried by said segments, a pivot stud loosely confining one of the ball segments to the disk and a substantially conical bearing between said stud and said loose segment and enlarged eccentrically to the axis of the stud.

14. In a liquid meter, a meter casing having opposed bearings, ball segments engaged with said bearings, a nutatory disk carried by said ball segments, one of said segments being loosely engaged with said disk, a packing member interposed between said loose segment and the disk and means for enabling liquid pressure against said packing member to hold the same in substantially liquid-tight engagement with said parts.

15. In a liquid meter, a meter casing having opposed bearings, ball segments engaged with said bearings, a nutatory disk carried by said ball segments, one of said segments being loosely engaged with the disk and a bearing spindle for said loose segment journaled in one of the bearings aforesaid and having an angularly-bent threaded end engaged in said loose ball segment.

16. In a liquid meter, a meter casing having opposed bearings, ball segments engaged with said bearings, a nutatory disk carried by said segments, one of said segments having a loose sliding fit with the face of the nutatory disk and having a pivotal mounting in the casing, the face of said loose segment which engages the disk being relieved for a portion of its extent to enable the disk to adapt itself to small obstructions.

17. In a liquid meter, a meter casing having opposed bearings, ball segments engaged with said bearings, a nutatory disk carried by said segments, one of said segments having a loose sliding fit with the face of the nutatory disk and having a pivotal mounting in the casing, the face of said loose segment which engages the disk being relieved for a portion of its extent to enable the disk to adapt itself to small obstructions and a pivot stud securing said loose segment to the disk, said segment having an eccentric bearing for said pivot stud.

18. In a liquid meter, a meter casing having opposed bearings, bearing segments engaged therewith, a nutatory disk carried by said bearing segments, one of said bearing segments having a spindle journaled in the bearing for said segment, whereby said segment will rotate on the axis of said spindle during nutation of the disk, and a pivot stud loosely securing said segment to the disk and confining the same thereto.

WALTER H. RICHARDS.